(12) United States Patent
Baker, IV

(10) Patent No.: US 9,583,108 B2
(45) Date of Patent: Feb. 28, 2017

(54) VOICE DETECTION FOR AUTOMATED COMMUNICATION SYSTEM

(71) Applicant: Forrest S. Baker III Trust, Murray, UT (US)

(72) Inventor: Forrest Baker, IV, Bluffdale, UT (US)

(73) Assignee: Forrest S. Baker III Trust, Murray, UT (US), U/A/D Dec. 30, 1992

( * ) Notice: Subject to any disclaimer, the term of this patent is extended or adjusted under 35 U.S.C. 154(b) by 688 days.

(21) Appl. No.: 13/833,960

(22) Filed: Mar. 15, 2013

(65) Prior Publication Data

US 2013/0204607 A1    Aug. 8, 2013

Related U.S. Application Data

(63) Continuation-in-part of application No. 13/315,266, filed on Dec. 8, 2011.

(51) Int. Cl.
| | |
|---|---|
| *G10L 19/00* | (2013.01) |
| *G10L 21/00* | (2013.01) |
| *G10L 15/00* | (2013.01) |
| *G10L 17/00* | (2013.01) |
| *G10L 25/51* | (2013.01) |

(52) U.S. Cl.
CPC .......... *G10L 17/005* (2013.01); *G10L 17/00* (2013.01); *G10L 25/51* (2013.01)

(58) Field of Classification Search
CPC ...... H04L 65/403; H04L 63/12; H04W 12/06; H04W 12/08; H04M 3/2281; H04M 2250/74; G10L 15/22; G10L 17/22; G10L 2015/223; G10L 17/00; G10L 17/26; G10L 25/78; G10L 17/005; G10L 17/04; G10L 21/003; G10L 21/0232; G10L 25/09; G10L 25/15; G10L 25/18; G06F 21/32; G06F 2221/2117

See application file for complete search history.

(56) References Cited

U.S. PATENT DOCUMENTS

| | | | | |
|---|---|---|---|---|
| 4,093,821 A | * | 6/1978 | Williamson | G10L 25/90 600/586 |
| 5,127,043 A | * | 6/1992 | Hunt | G06F 21/32 379/189 |
| 6,151,571 A | * | 11/2000 | Pertrushin | G10L 17/26 704/207 |
| 6,275,940 B1 | * | 8/2001 | Edwards et al. | 726/2 |
| 6,718,306 B1 | * | 4/2004 | Satoh | G10L 17/00 382/190 |

(Continued)

OTHER PUBLICATIONS

Mohri "International Preliminary Report on Patentability" for PCT Application No. PCT/US2014/027456, mailed Sep. 15, 2015, 9 pages.

*Primary Examiner* — Michael Ortiz Sanchez
(74) *Attorney, Agent, or Firm* — Kunzler Law Group

(57) ABSTRACT

A system implements voice detection using a receiver, a voice analyzer, and a voice identifier. The receiver receives a transmission from a transmission channel associated with a channel identification. The transmission includes a voice input. The voice analyzer analyzes the voice input and generates a plurality of voice metrics according to a plurality of analysis parameters. The voice identifier compares the voice metrics to one or more stored sets of voice metrics. Each set of voice metrics corresponds to a voice identification associated with the channel identification. The voice identifier also identifies a match between the voice metrics from the voice analyzer and at least one of the stored sets of voice metrics.

39 Claims, 6 Drawing Sheets

(56) References Cited

U.S. PATENT DOCUMENTS

| | | | |
|---|---|---|---|
| H2187 H * | 4/2007 | Yuchimiuk | 704/246 |
| 8,280,740 B2 * | 10/2012 | Di Mambro et al. | 704/273 |
| 2003/0055646 A1 * | 3/2003 | Yoshioka | G10L 13/033 704/258 |
| 2005/0060149 A1 * | 3/2005 | Guduru | G10L 25/78 704/233 |
| 2005/0114118 A1 * | 5/2005 | Peck | 704/208 |
| 2007/0050191 A1 * | 3/2007 | Weider et al. | 704/275 |
| 2007/0071206 A1 * | 3/2007 | Gainsboro et al. | 379/168 |
| 2007/0217586 A1 * | 9/2007 | Marti et al. | 379/201.01 |
| 2008/0113787 A1 * | 5/2008 | Alderucci et al. | 463/29 |
| 2008/0147439 A1 * | 6/2008 | Maliszewski | G06F 19/322 705/2 |
| 2008/0319740 A1 * | 12/2008 | Su | G10L 19/09 704/225 |
| 2009/0261947 A1 * | 10/2009 | Watanabe et al. | 340/5.82 |
| 2010/0106502 A1 * | 4/2010 | Farrell | G07C 9/00158 704/246 |
| 2012/0262296 A1 * | 10/2012 | Bezar | G10L 17/26 340/573.1 |
| 2013/0006630 A1 * | 1/2013 | Hayakawa | G10L 25/24 704/239 |
| 2013/0216029 A1 * | 8/2013 | Pawlewski | 379/88.01 |
| 2014/0046664 A1 * | 2/2014 | Sarkar et al. | 704/246 |
| 2014/0090039 A1 * | 3/2014 | Bhow | 726/7 |
| 2014/0237576 A1 * | 8/2014 | Zhang | G06F 21/32 726/7 |
| 2015/0056952 A1 * | 2/2015 | Mintz et al. | 455/411 |

* cited by examiner

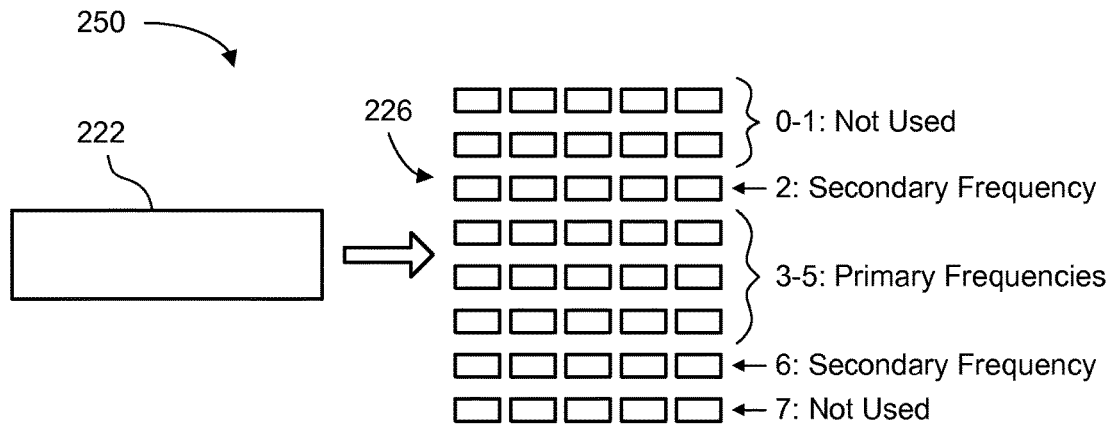
FIG. 11
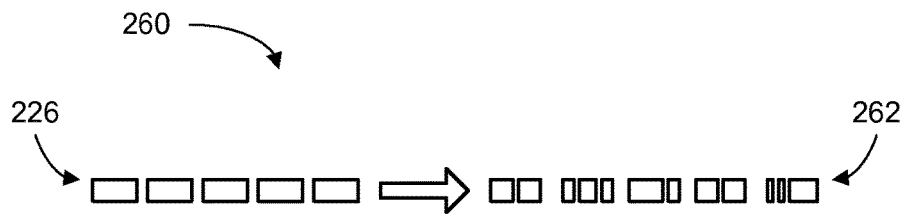
FIG. 12
| Channel ID | Voice ID | Voice Metrics | Other Data |
|---|---|---|---|
|  |  |  |  |
|  |  |  |  |
|  |  |  |  |
|  |  |  |  |
|  |  |  |  |
|  |  |  |  |
FIG. 13

VOICE DETECTION FOR AUTOMATED COMMUNICATION SYSTEM

CROSS-REFERENCE TO RELATED APPLICATIONS

This application claims priority to and is a continuation-in-part to U.S. application Ser. No. 13/315,266, filed on Dec. 8, 2011, which is incorporated by reference herein in its entirety.

BACKGROUND

Telemarketers process a large number of phone calls in order to maximize sales. Typically, the more phone calls that are initiated and processed, the more sales will be made. Automated dialers are used to initiate calls in many cases.

A relatively large proportion of calls are not connected to a live person. Many calls are simply not answered, while many others are answered by an answering machine or voice mail which plays a recorded voice, digital voice, or other non-live voice (collectively referred to herein as a "recorded voice"). It is important for phone call efficiency to recognize that a call has not been answered by a live person so that unanswered calls or recorded voices are not routed to agents for sales activity.

In contrast to detecting a recorded voice, there are also many instances when a person answers the telephone call. A voice that is not a recorded voice is considered a "live voice." While the detection of a live voice can be useful, conventional voice detection systems have difficulty identifying a specific person to whom the live voice belongs. Thus, conventional voice detection systems are relatively limited in their functionality.

SUMMARY

Embodiments of a system are described. In one embodiment, the system is a voice detection system. One embodiment of the system implements voice detection using a receiver, a voice analyzer, and a voice identifier. The receiver receives a transmission from a transmission channel associated with a channel identification. The transmission includes a voice input. The voice analyzer analyzes the voice input and generates a plurality of voice metrics according to a plurality of analysis parameters. The voice identifier compares the voice metrics to one or more stored sets of voice metrics. Each set of voice metrics corresponds to a voice identification associated with the channel identification. The voice identifier also identifies a match between the voice metrics from the voice analyzer and at least one of the stored sets of voice metrics. Other embodiments of the system are also described.

Embodiments of methods are also described. In one embodiment, the method is a method for script modification in a scripted dialog for a telephone call. An embodiment of the method includes establishing a verbal communication session on a communication channel between at least two communication participants. The method also includes identifying a channel identification for the communication channel. The method also includes identifying a first communication participant of the at least two communication participants from a set of potential communication participants associated with the channel identification. The method also includes electronically modifying a script presented to a second communication participant of the at least two communication participants in response to identifying the first communication participant. The script includes language prompts for the second communication participant to communicate to the first communication participant during the verbal communication session. Other embodiments of methods for modifying scripted dialogues are also described.

In other embodiments, the method is a method for delivering a script prompt based on a similarity with a previous conversation with another participant. An embodiment of the method includes monitoring verbal communications within a verbal communication session between a plurality of communication participants. The method also includes electronically comparing a flow of the verbal communications within the verbal communication session to a plurality of historical verbal communications stored in an electronic storage device. The method also includes determining that the flow of the verbal communications within the verbal communication session is compatible with at least one of the plurality of historical verbal communications. The method also includes deriving at least one script prompt from the at least one of the plurality of historical verbal communications with which the flow of the verbal communications within the verbal communication session is determined to be compatible. The method also includes electronically providing the derived script prompt to a first communication participant of the plurality of communication participants during the verbal communication session. Other embodiments of methods are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 11 depicts a schematic diagram of one embodiment of a process for filtering frequency bands from the voice input.

FIG. 12 depicts a schematic diagram of one embodiment of a process for splitting words into word segments.

FIG. 13 depicts a schematic diagram of one embodiment of a data structure to store voice metrics and other information in a voice metrics database.

Throughout the description, similar reference numbers may be used to identify similar elements.

DETAILED DESCRIPTION

Figure 1:
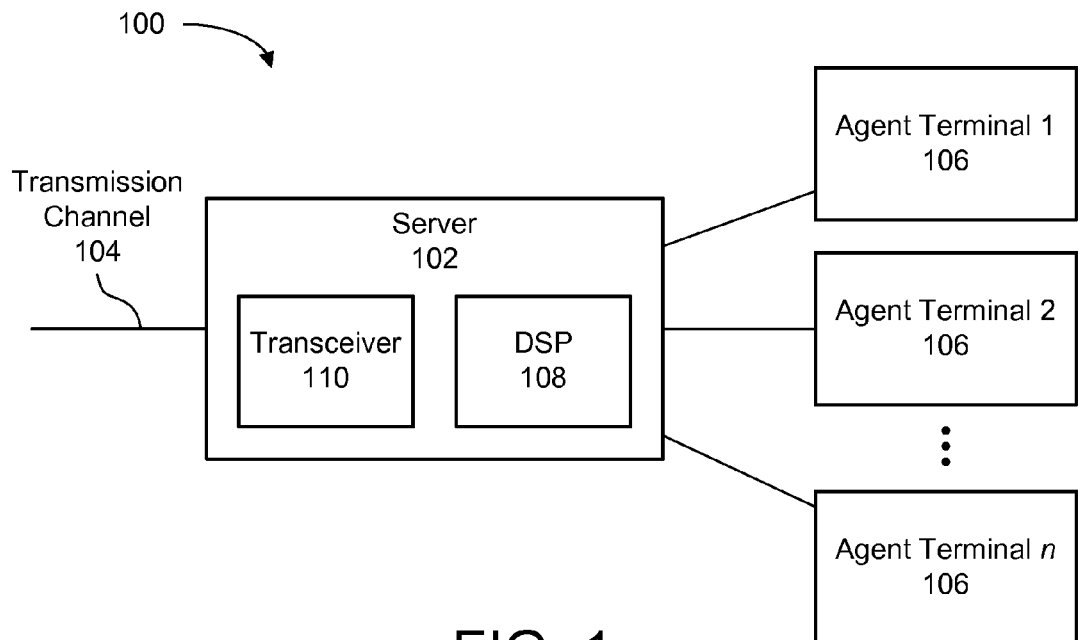
FIG. 1 depicts a schematic block diagram of one embodiment of a system for identifying a voice.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Many of the functional units described in this specification have been labeled as modules, in order to more particularly emphasize their implementation independence. These functional components are at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented using software, stored on a physical storage device (e.g., a computer readable storage medium), for execution by various types of processors. Examples of a computer-readable storage medium include, but are not limited to, a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices which are referred to herein as computer readable media.

In some embodiments, the software portions are stored in a non-transitory state such that the software portions, or representations thereof, persist in the same physical location for a period of time. Additionally, in some embodiments the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of embodiments of the invention may be combined in any suitable manner in one or more embodiments. In the following description, numerous specific details are provided, such as examples of programming, software modules (stored on a physical device), user selections, network transactions, database queries, database structures, hardware modules, hardware circuits, hardware chips, etc., to provide a thorough understanding of embodiments of the invention. One skilled in the relevant art will recognize, however, that embodiments of the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

While many embodiments are described herein, at least some of the described embodiments relate to a voice recognition or voice detection system. Using some or all of the operations and techniques described herein, some embodiments of the system are able to determine the gender of a person on a phone call. In some embodiments, the system is capable of identify a specific person at a known location (or communicating on a known communication channel). In other embodiments, the system is capable of distinguishing between live voices and recorded voices on a phone call. Other embodiments include additional functionality as described herein.

FIG. 1 depicts a schematic block diagram of one embodiment of a system 100 for identifying a voice. The illustrated system 100 includes a server 102, a transmission channel 104, and a plurality of agent terminals 106. In one embodiment, the system 100 analyzes a communication stream from the transmission channel 104 to determine if the communication stream includes a live voice or a recorded voice. In another embodiment, the system 100 analyzes a communication stream from the transmission channel 104 to determine the gender of the person inputting the communication stream. In another embodiment, the system 100 analyzes a communication stream from the transmission channel 104 to identify the person inputting the communication stream, selected from a group of people historically known to communicate from the same location (e.g., originating telephone number, geographic location, etc.).

The server 102, in one embodiment, is a computer capable of performing operations to distinguish and identify a voice. The illustrated server 102 includes a digital signal processor (DSP) 108 and a transceiver 110 (or a receiver and a transmitter). The server 102 also may include other processors, volatile memory, persistent memory, and input/output interfaces typically included in electronic computing devices. An embodiment of the DSP 108 of the server 102 is described in greater detail below in relation to FIG. 2.

In some embodiments, the server 102 is a single computer. In another embodiment, the server 102 includes a plurality of computers. Functions of the server 102 may be distributed across the plurality of computers and/or DSPs 108.

The transmission channel 104, in one embodiment, transmits a communication stream to the server 102. The transmission channel 104 may be any type of transmission device (or combination of transmission devices) capable of transmitting a communication stream between the server 102 and another communication node (not shown). For example, the transmission channel 104 may be a T1 line that transmits multiple voice conversations simultaneously. In another example, the transmission channel 104 may be an Ethernet connection. Other embodiments may include other types of communications lines. In some embodiments, the term "transmission channel" includes the transmissions lines and/or devices specific to particular user (e.g., cell phone) or location (e.g., home or business).

The communication stream transmitted by the transmission channel 104 may be any type of communication stream. For example, the communication stream may be a telephone call, a video call, or a voice over internet protocol (VOIP) connection. Other embodiments may include other types of communications streams.

In some embodiments, the server 102 manages the transfer of communication streams to the agent terminals 106. The server 102 may determine which communication streams to transfer based on a determination of the status of the communication stream, a current or projected load at one or more agent terminals 106, or one or more other factors.

The agent terminals 106, in one embodiment, each may be operated by an agent such as a human operator. Each agent terminal 106 may receive one or more communication streams from the server 102 to be handled by the agent. For example, an agent terminal 106 may present two simultaneous communication streams to the agent. Each simultaneous communication stream may undergo processing by the server 102 to determine if the communication stream includes a recorded voice before or while the communication streams are presented to the agent. One or more of the presented communication streams may be determined to be a recorded voice subsequent to being presented to the agent and, in response, be removed from the agent terminal 106 and disposed.

The agent terminals 106 may be any type of terminal capable of delivering one or more communication streams to an agent. For example, each agent terminal 106 may be a computer with a processor, a display, a keyboard, and a headset for outputting and interacting with one or more communication streams. Other embodiments may be implemented using other types of devices including, but not limited to cellular telephones, tablets, laptops, and so forth.

Figure 2:
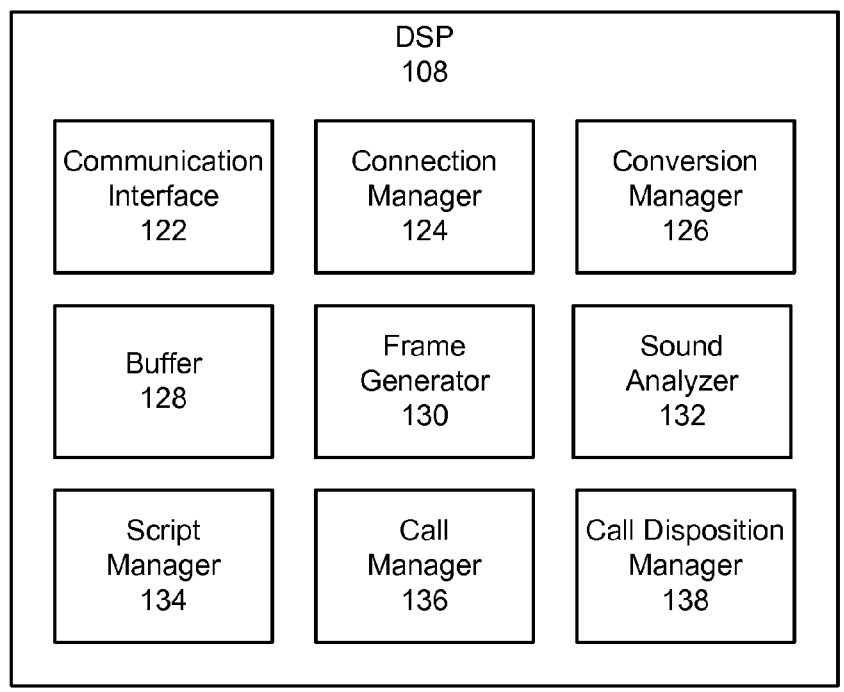
FIG. 2 depicts a schematic block diagram of one embodiment of the digital signal processor (DSP) of FIG. 1.

FIG. 2 depicts a schematic block diagram of one embodiment of the DSP 108 of FIG. 1. In general, the DSP 108 performs digital analysis and operations on a communication to characterize certain parameters of the communication stream. For example, the DSP 108 may distinguish live voices from recorded voices in communication streams. In another example, the DSP 108 also may distinguish live voices from non-voices in communication streams. In another example, the DSP 108 may determine the gender of a person participating in the communication stream. In another example, the DSP 108 may identify a specific person (or voice identification corresponding to a specific set of voice metrics) associated with the voice signals within the communication stream. In one example, the DSP 108 is a Dialogic® telephony interface board available from Dialogic Incorporated of Milpitas, Calif. The DSP 108 unit may include, without limitation, a digital telephony interface, a voice digitizing interface for computers and computer controlled telephone interfaces, an audio coupling interface between telephone and computers, a digitized voice-editing computer program, an audio multiplexer, and the like.

In the illustrated embodiment, the DSP 108 includes several functional components. Each functional component may have corresponding structural circuitry, logic, or other hardware to implement the corresponding functions. In some embodiments, the functions corresponding to separately illustrated functional components may be implemented with common or shared physical structures.

Figure 3:
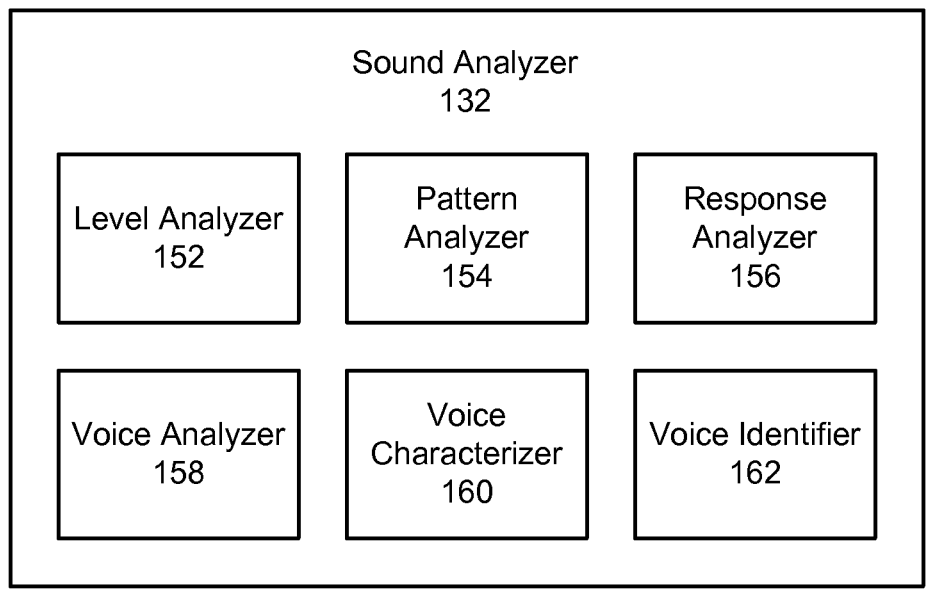
FIG. 3 depicts a schematic block diagram of one embodiment of the sound analyzer of FIG. 2.

The illustrated DSP 108 includes a communication interface 122, a connection manager 124, a conversion manager 126, a buffer 128, a frame generator 130, a sound analyzer 132, a script manager 134, a call manager 136, and a call disposition manager 138. In turn, the sound analyzer 132 may include a level analyzer 152, a pattern analyzer 154, a response analyzer 156, a voice analyzer 158, a voice characterizer 160, and a voice identifier 162, as illustrated in FIG. 3 and explained in more detail below.

The communication interface 122, in one embodiment, provides a physical interface to receive the communication stream from the transmission channel 104. In a specific embodiment, the communication interface 122 interfaces with the transceiver 110 which receives the communication stream input into the server 102. The communication interface 122 may receive a single communication stream or multiple communication streams simultaneously (or approximately simultaneously). The communication stream may be established through an internet connection or through another type of telephone connection. In some embodiments, the communication interface 122 includes an echo canceller (not shown) that cancels echo in the communication stream.

The communication interface 122 may be any type of interface capable of receiving, sending, and/or processing a communication stream. In one embodiment, the communication interface 122 is implemented within the DSP 108 to initially process the incoming communication streams and/or the outgoing communication streams. In other embodiments, the communication interface 122 may be another type of hardware and/or software.

The connection manager 124, in some embodiments, manages connections of communication streams on the transmission channel 104 with individual agent terminals 106, or with other components within the DSP 108. Connections of communication streams may include incoming and outgoing phone calls. For example, the communication stream may be an outgoing phone call from the server 102 to another telephone device, and the connection manager 124 may determine a number to dial and initiate dialing of the number. The connection manager 124 may select numbers to call from a database and track call outcomes for a number. In another example, the communication stream may be an incoming phone call to the server 102 from another telephone device.

The process of establishing, initiating, or recognizing a connection with a communication stream is referred to herein as a connection event, or connect event. For example, a connect event may be a pick-up by the phone that is called by the system 100. As another example, a connect event may be a pick-up by the system 100 if someone is calling or otherwise contacting the system 100.

The conversion manager 126 converts incoming data from one format to another format. In one embodiment, the conversion manager 126 converts analog data into digital data. In one embodiment, the conversion manager 126 turns an analog signal into digital data in the form of a stream of numbers. It will be appreciated by those of skill in the art, in light of this disclosure, that the numbers may have a discrete value range. Additionally, the conversion manager 126 may convert digital data from one form to another form. For example, the conversion manager 126 may convert digital voice data representative of the frequencies and amplitude of a caller's voice into digital sound data representative of a specific sound characteristic of the caller's voice. For example, the conversion manager 126 may form a new digital signal representative of the amplitudes, or volume, of the caller's voice, separate from the frequencies of the caller's voice. Other sound characteristics may include, but are not limited to, power, intensity, energy, and so forth.

The conversion may be an algorithmic conversion of the data. In some embodiments, the conversion is a base conversion. For example, the conversion may convert the data to base two. In another embodiment, the conversion is a logarithmic conversion.

In one embodiment, incoming data of the communication stream may be continually received and converted into numbers representative of volume levels. These numbers may be referred to as samples. In one embodiment, the incoming input is the individual digital data created by the digital signal processor.

It will be appreciated by those of skill in the art, within the context of this description, that the number of digital samples depends upon the rate of capture or fidelity of the DSP 108 being used. In some embodiments, the DSP 108 provides up to 6000 samples per second. In another embodiment, the DSP 108 provides about 8000 samples per second. A rate of 8000 sample per second is understood to have capacity to replicate the full range of human voice. In another embodiment, the DSP 108 provides about 16000 samples per second. In another embodiment, the DSP 108 provides about 22500 samples per second. In another embodiment, the DSP 108 provides about 41100 samples per second. Other embodiments may utilize a different sampling rate.

In some embodiments, the data to be converted by the conversion manager 126 is the incoming audio of the communication stream. In other words, the data converted by the conversion manager 126 may represent the audio generated at the called location. The converted data may use any number of bits to represent the volume, energy, or power of the incoming data. In one embodiment, the conversion manager 126 outputs 16 bit samples at a sampling rate of 8000 samples per second. Other embodiments may output samples using a different number of bits. The output of the conversion manager 126 may include a measure of the volume, energy, power, or other metric of the communication stream contained by the one or more frames.

In some embodiments, the buffer 128 receives data from the conversion manager 126 and stores the received data for use by other components of the DSP 108. The buffer 128 may be any type of hardware storage medium capable of storing communication stream data. For example, the buffer 128 may be random access memory (RAM) of the server 102 allocated to the buffer 128. Other embodiments may include different types of buffers.

The frame generator 130, in one embodiment, obtains the converted data, for example, from the buffer 128 and creates a plurality of frames. Each frame contains data from the content stream that covers a period of time. In one embodiment, the frame generator 130 divides the digital data into frames of about 4 milliseconds. In another embodiment, the frame generator 130 divides the digital data into frames of about 8 milliseconds. In yet another embodiment, the frame generator 130 divides the digital data into frames of about 16 milliseconds. In another embodiment, the frame generator 130 divides the digital data into frames of about 32 milliseconds. In other embodiments, other time units may be used for the frames. Other types of division, using words or word segments, are described below.

As one example, each frame may include approximately 16 ms of data from the content stream. At 8000 samples per second, a 16 millisecond frame will contain approximately 128 samples. If each sample is 16 bits, then the total size of each frame will be approximately 256 bytes of data from the content stream. Other embodiments may use a different time unit that is shorter or longer than 16 ms for the frame, in which case the total size of the frame will vary accordingly. Frames may be of any size or cover any length of time. The frame generator 130 may continuously generate frames as the communication stream is received.

The frame generator 130 further establishes a frame value for each frame. In general, the established value for each frame is representative of a statistical measurement or indicator of the samples within the frame. In one embodiment, the established value for each frame is indicative of an average value of the digital samples in the frame. Other embodiments may use different statistical measurements or indicators. Additional statistical metrics are described in more detail below with reference specific sub-components of the sound analyzer 132 in FIGS. 3 and 4.

In some embodiments, the frame generator 130 may convert the established value into an equivalent numerical format. One example of an equivalent numerical format is a logarithmic format, although other embodiments may use other formats. In some embodiments, converting the established value of a frame into a different numerical format may simplify other data analysis operations. For example, noise is typically measured in decibels (a logarithmic unit) and conversion of the digital data into logarithmic format may simplify or enhance comparisons of volume levels, especially for distinguishing between sound characteristics at lower volumes.

In the embodiment where the established value of each frame is the average of samples over a 16 ms period of time, and then the established value is converted into a logarithmic format, the volume level represented by the logarithmic frame values may range from 0 to about 14. Given a discrete range of potential frame values, a specific type of conversion can be implemented to result in a variety of ranges of volume levels. Accordingly, generating logarithmic frame values between about 0 and about 14 from volume levels of the communication stream is just one non-limiting example.

Upon recognizing a connect event and generating frame values in an acceptable format, the DSP 108 can start to examine or analyze the echo-cancelled communication stream to distinguish voice within the communication stream. In one embodiment, the sound analyzer 132 performs some or all of the analysis functions described herein. A more detailed example of the sound analyzer 132 is described below with reference to FIGS. 3 and 4.

The script manager 134, in one embodiment, manages the transmission of one or more scripts to an operator and/or directly to the person participating in the telephone call. The script manager 134 may trigger the intro script in response to detecting a pattern of volumes that indicate speaking in received frames. For example, the script manager 134 may trigger transmission of an intro script in response to a pattern of volumes in frames that corresponds to a person saying "Hello" and then pausing.

In one embodiment, the script manager 134 triggers transmission of the intro script in response to determining that there is a possibility that the communication stream is connected to a live person. For example, the script manager 134 may act in response to an analysis of volume levels of a group of frames that corresponds to a live person speaking, rather than a recording.

The script manager 134 may include a strong presumption that the communication stream is connected to a live person. Since many laws restrict outcomes that result from mistakenly detecting a recorded voice, this preference for assuming that a live person has been contacted may help in compliance with those laws. In addition, the DSP 108 may continue to monitor and analyze the communication stream after the intro script has been triggered to further refine the detection of recorded voices.

In some embodiments, the script manager 134 triggers transmission of the intro script by directing an agent to perform the script. In other words, the transmission of the triggered script may include live speaking by an agent. In another embodiment, the script manager 134 triggers transmission of the intro script by playing prerecorded audio, such as an audio recording of a person reading the script.

In further embodiments, the script manager 134 can alter or modify an ongoing script based on ongoing analysis of a person's voice, triggers detected during a conversation, identification of a specific person at a location, or identification of a person with matching voice metrics or matching behavioral parameters as another person for who a successful communication previously occurred.

The call manager 136, in one embodiment, manages transfers of communication streams to agent terminals 106. The call manager 136 may transfer a communication stream to an agent terminal 106 in response to a preliminary determination that there is a possibility that the communication stream is connected to a live person. In some embodiments, the call manager 136 may transfer the communication stream in response to the script manager 134 triggering transmission of an intro script.

The call disposition manager 138 disposes of communication streams in response to the DSP 108 determining that the communication stream is connected to a recorded voice. The call disposition manager 138 may disconnect a communication stream in response to detection of a recorded voice.

FIG. 3 depicts a block diagram of one embodiment of the sound analyzer 132 of FIG. 2. The illustrated sound analyzer 132 includes a level analyzer 152, a pattern analyzer 154, and a response analyzer 156. In general, the sound analyzer 132 monitors and evaluates sound characteristics from one or more communication streams. In one embodiment, the sound analyzer 132 distinguishes and/or identifies voices on communication streams. The sound analyzer 132 may perform diagnostics and/or implement one or more algorithms to determine if sound received on a communication stream corresponds to a live person.

In one embodiment, the sound analyzer 132 may compare patterns of volume levels in a group of frames to one or more predetermined patterns that indicate a recorded voice. The sound analyzer 132 may also analyze volume levels in a group of incoming frames received while an outbound communication is being transmitted. The sound analyzer 132 may determine that the communication stream is connected to a recorded voice in response to receiving data from frames of an incoming data stream containing a volume that corresponds to talking while the outbound communication is being transmitted.

In one embodiment, the level analyzer 152 analyzes a volume level of one or more frames to determine one or more reference levels. The one or more reference levels may correspond to a volume at which a frame is determined to contain a particular type of content. For example, the level analyzer 152 may determine a silence baseline level that corresponds to a frame which does not contain speaking by the person being called. The level analyzer 152 may also establish a reference talking volume level that corresponds to a volume at which the person being called is talking. An embodiment of the level analyzer 152 is described in greater detail in relation to FIG. 4 below.

The level analyzer 152 also analyzes the volume level of a group of frames to determine a status of the communication stream. The status may be undetermined, may be determined to be a live person, or may be determined to be a recorded voice. Determination of the status of the communication stream may be an ongoing process as the communication stream is received. The sound analyzer 132 may continue to determine the status of the communication stream as an agent interacts with the communication stream.

The pattern analyzer 154, in one embodiment, compares patterns detected in an incoming component of the communication stream to one or more predetermined patterns to detect or identify a recorded voice. The pattern analyzer 154 may use the silence baseline volume and the reference talking volume to determine frames in which speech is being transmitted via the incoming component of the communication stream. The pattern analyzer 154 may determine patterns of speech in the incoming component of the data stream.

For example, the pattern analyzer 154 may detect five periods of speech separated by five periods of silence. The pattern analyzer 154 may interpret this pattern as five consecutive words, and determine that this pattern may be indicative of a recorded voice. Similar functionality may be implemented by sub-components of the voice analyzer 158, which are described in more detail with reference to FIG. 5. In another example, the pattern analyzer 154 may detect periods of speech separated by relatively short periods of silence. The pattern analyzer 154 may determine that this pattern is indicative of a recorded voice.

The response analyzer 156, in one embodiment, determines the status of the communication stream by analyzing a response in the incoming component of the communication stream to an outgoing message. The response analyzer 156 leverages a typical response to hearing speech on the other end of a connection. Many people respond to hearing speech with silence. While the person on the other end of the communication stream listens to a message being transmitted from the server 102, the response analyzer 156 detects silence from the incoming component of the communication stream and determines that the status of the communication stream is not a recorded voice. Conversely, if the response analyzer 156 detects that speech on the incoming component of the communication stream continues while an outgoing message is being transmitted from the server 102, the response analyzer 156 may determine that the status of the communication stream is a recorded voice. In one embodiment, the response analyzer 156 may analyze the incoming component of the communication stream during transmission of the intro script.

Figure 4:
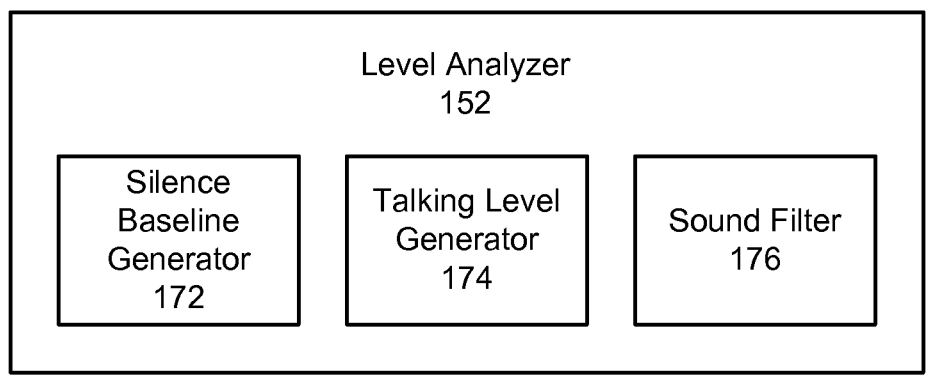
FIG. 4 depicts a schematic block diagram of one embodiment of the level analyzer of FIG. 3.

FIG. 4 depicts a block diagram of one embodiment of the level analyzer 152 of FIG. 3. The level analyzer 152 includes a silence baseline generator 172, a talking level generator 174, and a sound filter 176. The level analyzer 152 determines one or more reference volume levels for the communication stream.

The silence baseline generator 172, in one embodiment, detects a silence baseline volume that corresponds to a period of relative silence on the communication stream. The period of relative silence represents the ambient sound in the environment and interference sound present on the transmission channel. The silence baseline is used to help determine which frames include something other than silence, for example, speech.

In some embodiments, the talking level generator 174 detects a reference talking volume that corresponds to speech on the incoming portion of the communication stream. The reference talking volume is generally a higher volume than the silence baseline volume. As explained above, in some embodiments using a logarithmic value makes differences between the silence baseline volume and the reference talking volume more distinct.

The sound filter 176, in one embodiment, identifies volume levels that correspond to neither silence nor speech. The sound filter 176 may cause the level analyzer 152 to disregard these sounds when determining the silence baseline volume and/or the reference talking volume. At higher noise levels, the difference between the volume level for voice versus the ambient sound is greater than at lower levels.

Additionally, the sound filter 176 may operated on the concept that a human speaker will typically attempt to speak louder than ambient sounds in order to be heard. At louder or higher noise levels, it may take more word frames to determine that the noise is speaking or voice. At lower levels, the ambient is quieter, so it takes a smaller volume level difference to assume voice, as well as a shorter word frame. With this mind, large amplitude increases that are not long enough in duration can be ruled or filtered out. Thus, for example, a background bark from a dog may increase the volume level, but the duration of that increase, or the duration of the word frame is such that it would not be associated with speaking. Similarly, a child's scream may be of a significantly longer duration such that the length of the word frame may not be associated with speaking.

The following examples may be useful to illustrate some of the further functionality of the DSP 108 and, in particular, the sound analyzer 132.

When determining whether sound during a call is a live voice versus a recording voice or other sound, an initial volume level be determined or set to be a silence baseline. That silence baseline is kept at the value of the initial volume level until a difference in the volume level is detected, which difference may be an increase or decrease. This differentiation may represent a differentiation in sound amplitude. In one embodiment, a big differentiation in volume levels is determined to be voice and a small differentiation is determined to be noise. Voice may be live or recorded. A recorded voice is typically associated with an answering machine. Noise may be any number of sounds that occur over a telephone line. Some examples of noise include static or other system noises, background noises such as music, appliances, or any number of sounds that are not voice.

In one example, the silence baseline generator 172 establishes a silence baseline when a drop in sound occurs, for example in a situation in which a high volume level was detected at the beginning of a communication stream and then the volume level decreases. In another example, the silence baseline generator 172 establishes a silence baseline when an increase in sound occurs, for example in a situation in which a low volume level is present at the beginning and then spikes up. In these examples, the lower volume level may be designated as the new silence baseline. These lower volume levels are considered to be "silence" even if the volume levels are well above normal noise level values, as long as there is a distinguishable change between the lower and higher volume levels. In other embodiments, the initial volume level may be set as the silence baseline value, regardless of the actual volume level. The silence baseline volume subsequently may be reset at a different level in response to a determination that the silence baseline level should be lower. For example, the silence baseline level initially may be set at the higher level and then reset to the lower level. In contrast, the silence baseline level initially may be set at the lower level and then maintained at the lower level even after the higher volume level is detected.

In some embodiments, the distinction between voice and other noise is determined based on the length of an elevated volume level in comparison to the silence baseline. In one example, a volume level which exceeds the silence baseline by a predetermined amount for a predetermined time is considered voice. The predetermined amount or volume level may be one or more of the reference volume levels (e.g., 0-15 levels) used for comparison and analysis. One such reference volume level may be a reference talking volume that is a volume level associated with speaking.

In one embodiment, the establishment of voice versus noise may also be determined by measuring the number of "word frames" created, where a word frame is a group of frames at an increased volume level from the silence baseline. Thus, a word frame may be the equivalent of the length of a plateau in a waveform. The number of these word frames may indicate voice versus noise. For example, standard words may be at least as long as 5 to 10 frames, whereas an increase for only 1 to 3 frames is usually just noise.

In one embodiment, differences in volume levels at lower volume levels may be smaller to indicate voice versus noise, while differences in volume levels at higher volume levels may need to be bigger to indicate voice versus noise. For example, where a silence baseline or current volume level is below 5, an increase of 1 volume level may be associated with voice instead of sound. Where a silence baseline or current volume level is above 5, a larger difference of 2, for example, may need to occur to assume voice versus noise. Noise may be associated with 1 or 2 frames of sustained increase at the lower levels, whereas voice may be established at 3 or more frames. These numbers are merely examples, and other numbers or values may be used in different embodiments.

In one embodiment, intermediary sounds from the communication stream may be filtered out by analyzing the incoming component of the converted data to filter frames having a volume level corresponding to sounds other than a speaker's voice. For example, where the volume level associated with the incoming component has a lower value, it typically means there is very little sound coming from the background or ambient. Where there is louder background noise, people instinctively may speak louder in order to be heard over the ambient noise. Thus, the volume level associated with voice is higher when there is more ambient or background noise and lower when there is less ambient or background noise. Thus, at higher levels of noise the amplitude of voice is going to be a bigger difference over ambient sound, or in other words a greater magnitude of difference. Under these rules, the silence baseline can be reset to a higher value to essentially filter out sounds other than a speaker's voice, which other sounds might be correspond to spikes in volume levels. For example, where a noise such as a dog bark will be at a different volume level differential from the silence baseline and/or a different duration of time than a human speaking voice, the system can ignore or filter out these sounds and/or adjust the silence baseline or reference talking volume to eliminate or minimize the influence of these sounds on the volume level analysis.

In one embodiment, the pattern analyzer 154 interprets or distinguishes between live voice, recorded voice and other sounds. Where the silence baseline is established and then the voice is established by a raise of volume level. The level is sustained for a time indicating talking. Then the there is silence for a time. This is a natural pattern for a live voice. A person answers "hello" or with some other word or phrase and then waits for an expected reply.

Where there is an initial greeting or sound, followed by a relatively quiet pause, the pattern analyzer 154 may perform additional analysis to determine if the sound corresponds to a live voice. However, if there a long sustained duration of sound consistent with voice, the pattern analyzer 154 may rely on a strong probability that the voice is recorded. Normal phone conversation openings typically do not contain long run-on portions, which is more typical of answering machines with predetermined messages to deliver. The pattern analyzer 154 recognizes these and other patterns and provides feedback to the sound analyzer 132, accordingly.

If the agent or operator of the system speaks at any time during sound levels that are determined to be live voice, and there is not an immediate or timely stop or drop in volume level, then the pattern analyzer 154 may determine that the communication stream is an answering machine or other recorded voice. There is a relatively high probability that a live person would not continue to talk when the other party to the conversation starts talking. In contrast, a recorded voice would likely continue playing regardless of when the other party talks. This is one of many ways the pattern analyzer 154 can distinguish live voice from recorded voice.

In one embodiment, the pattern analyzer 154 analyzes the length and/or frequency of the pauses between higher volume levels to distinguish between live voice and recorded voice. As one example, live voice may have a cadence and pace that is different than recorded voices, and these patterns can be detected and analyzed to distinguish between live voice and recorded voice.

Other patterns unique to live voice and/or recorded voice also may be used to distinguish between them. For example, the variation of volume differentials is different between live voice and recorded voice. Live voice typically has greater variation in volume levels than recorded voice, which can sometimes be more monotone. These patterns can be stored and compared to the patterns established in the communication stream. Accordingly, patterns that correspond to recorded voice or to live voice can be determined and stored and used by the pattern analyzer 154 to distinguish between live voice and recorded voice. Some of the factors that can be patterned are length and frequency of voice, length and frequency of pauses or periods of reduced voice, magnitude of voice and volume level, variation in volume levels, and the like.

In one embodiment, an array of volume levels which span the possible range of frame values (either native or as logarithmic values, for example) as limited by the DSP 108 is initialized to zero. In one embodiment, the range of frame values is represented by 14 entries. Other embodiments may use representations that include fewer or more entries.

As each frame value is added into the array, a comparison of the new frame value is made with a stored value. If a large difference in volume level, as represented by the converted data value, is detected, then a boundary differential state begins and the lower volume level is established as a silence baseline level. The silence baseline level may be established even if the state or array entry at the beginning of the boundary differential state has a volume level which can be considered noise. This initializes a counter for the duration of the heightened noise or silence with time adding to the counter in an attempt to determine the duration.

Once a noise, live voice word, or some random sound such as a dog bark or other sound has finished and the volume level drops back to the then current silence baseline level, a counter begins to determine the length of volume level at or near the silence baseline. Normal human live speech patterns may dictate a certain latitude for expectation in response time. So, if the duration of volume level at the then current silence baseline reaches the expected length of time, then live voice most likely occurred on the 'customer' end, live voice is presumed, and a trigger state is changed to launch a trigger state change that sends a signal initiating a conversation with a live agent.

If a word boundary continues for a longer than acceptable period of time, then the speech may be designated as recorded voice and may be discarded as an answering machine. Alternatively, if the initial amount of time for nominal silence is exceeded (multiple word boundaries with no expected length of silence allowing for interruption), then again the received input may be designated as recorded voice and discarded.

This method is then continued in order to establish when the call participants' voice is being used to present the agent with visual cues that the person is speaking and direct their attention to said person in order to handle call. Various states may be used in order to provide more accurate reporting of what kind of voice pattern the sound analyzer 132 receives or expects to receive (e.g., phrase, answering machine, single word, etc.) in order to optimize user experience and provide acceptable customer service.

In one embodiment, if no differential in volumes is apparent during initial sound volume comparisons, then a prompt may be used to illicit a response from the other party. This prompt may be used to then motivate the customer to provide a sample of volume differential. If a noise is then detected, distinguishing sound features may be recognized and determined to be a live or recorded voice, or other sound. Otherwise, the call may be determined to be dead air caused by any number of possible reasons such as accidental hang up, mute button pressed, etc., and the call may be terminated.

Returning to FIG. 3, the illustrated sound analyzer 132 also includes a voice analyzer 158. In one embodiment, the voice analyzer 158 performs additional analysis functions to further analyze a voice input and generate voice metrics descriptive of the voice input. Some of these analysis functions may at least partially overlap with functions already described above, in which case duplicate functionality need not be implemented within the sound analyzer 132.

Figures 5, 6:
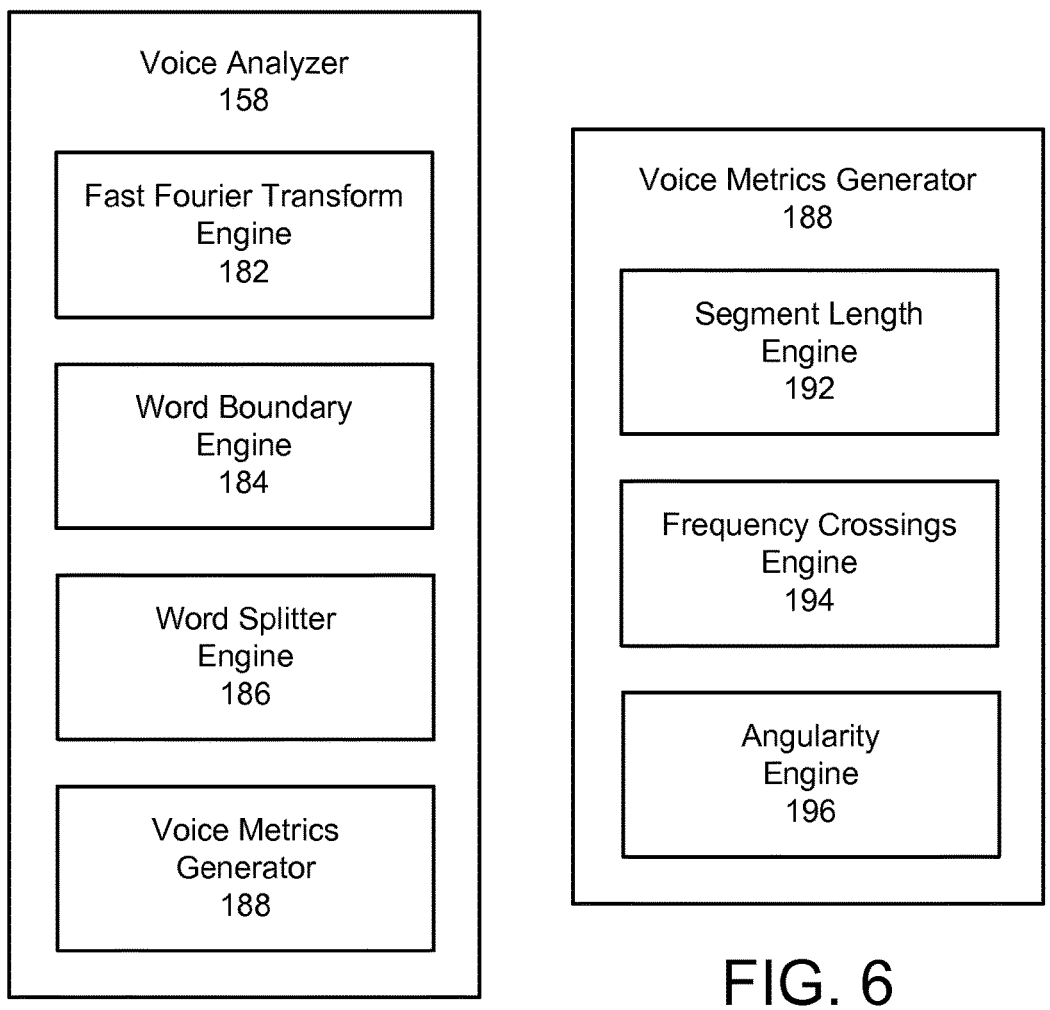
FIG. 5 depicts a schematic block diagram of one embodiment of the voice analyzer of FIG. 3.
FIG. 6 depicts a schematic block diagram of one embodiment of the voice metrics generator of FIG. 5.

FIG. 5 depicts a schematic block diagram of one embodiment of the voice analyzer 158 of FIG. 3. The illustrated voice analyzer 158 includes a fast Fourier transform (FFT) engine 182, a word boundary engine 184, a word splitter engine 186, and a voice metrics generator 188. In general, the FFT engine 182, word boundary engine 184, and word splitter engine 186 may perform functions that are, in a way, preparatory to allow the voice metrics generator 188 to generate specific voice metrics representative of the input voice on the transmission channel 104.

Figure 8:
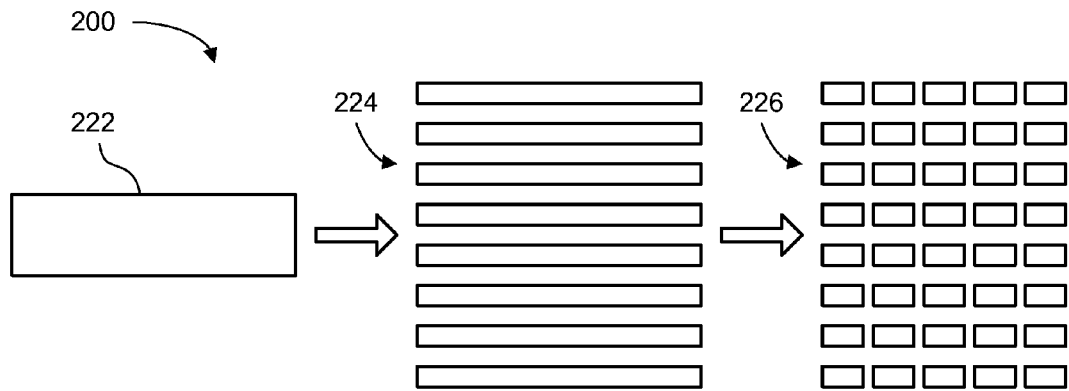
FIG. 8 depicts a schematic diagram of one embodiment of a process for applying FFT spectrum analysis and word boundary delineation to a voice input.

In one embodiment, the FFT engine 182 generates a FFT spectrum analysis of the voice input. The FFT spectrum analysis includes a plurality of frequency bands from the voice input. FIG. 8 illustrates a schematic diagram of one embodiment of a process 200 for applying FFT spectrum analysis to a voice input 222. The voice input 222 is provided to the FFT engine 182, which generates a plurality of signals 224 in different frequency bands. Each signal 224 represents the frequency signals from the original voice input 222 there are present in the specific corresponding frequency band. In the illustrated embodiment, the voice input 222 is separated into eight different frequency bands 224. However, in other embodiments, fewer or more frequency bands may be used by the FFT engine 182. As one example, the following pseudo-code defines eight separate bands.

```
if (Freq < 33)
{
dictOctaves[Octaves.Zero] += Vol;
}
else if (Freq < 65)
{
dictOctaves[Octaves.One] += Vol;
}
else if (Freq < 131)
{
dictOctaves[Octaves.Two] += Vol;
}
else if (Freq < 262)
{
dictOctaves[Octaves.Three] += Vol;
}
else if (Freq < 523)
{
```

-continued

```
dictOctaves[Octaves.Four] += Vol;
}
else if (Freq < 1046)
{
dictOctaves[Octaves.Five] += Vol;
}
else if (Freq < 2093)
{
dictOctaves[Octaves.Six] += Vol;
}
else if (Freq < 3000)
{
dictOctaves[Octaves.Seven] += Vol;
}
```

Returning to FIG. 5, the word boundary engine 184, in one embodiment, identifies a start boundary and an end boundary for a word within the voice input 222 based on corresponding time periods preceding and following sounds determined to be the word. As mentioned previously, a number of frames may be combined and analyzed together in order to determine how long of a period of relative silence exists before or after a word, as well as how long the word might be. The process 200 illustrated in FIG. 8 also depicts separating portions of the individual frequency bands 224 into distinct words 226. Thus, each individual frequency band 224 may have slightly different word boundaries, depending on the frequencies that are included in each word. In some embodiments, the word boundaries identified in each of the different frequency bands are substantially similar, or are normalized relative to each other. Once the words boundaries are identified, the voice metrics generator 188 can generate voice metrics for each identified word 226.

Referring to FIG. 6, a schematic block diagram of one embodiment of the voice metrics generator 188 of FIG. 5 is shown. The illustrated voice metrics generator 188 may be configured to generate any number or type of metrics descriptive of features of the frequency signals derived from the voice input 222. In a particular embodiment, the voice metrics generator 188 generates voice metrics representative of each of the words identified by the word boundary engine 184.

The illustrated voice metrics generator 188 includes a segment length engine 192, a frequency crossings engine 194, and an angularity engine 196. In one embodiment, the segment length engine 192 identifies the length of a word 226. The length may be expressed in any quantitative format. For example, the length may be expressed in terms of the number of frames or the absolute time value (for example, in milliseconds) corresponding to the identified word. In one embodiment, the frequency crossings engine 194 identifies the number of frequency crossings within a word 226. A frequency crossing is defined herein as a transition between the "positive" and "negative" portions of a sinusoidal signal. Each time the frequency signal crosses the "zero" threshold, or the threshold approximately corresponding to a direct current component of the signal, a frequency crossing is counted. Using this technique, each word 226 may be characterized by the number of times that the sinusoidal signal experiences a zero crossing. In a further embodiment, the angularity engine 196 identifies an angular expression to generally represent the rising and falling angles of the sinusoidal signal. Each time the signal crosses the zero, or DC, threshold, the slope from the zero crossing time to the subsequent peak or trough time may be related to the amplitude (or change in amplitude) of the frequency signal in order calculate an angularity, angular momentum, or radial type of that portion of the frequency signal.

Figure 9:
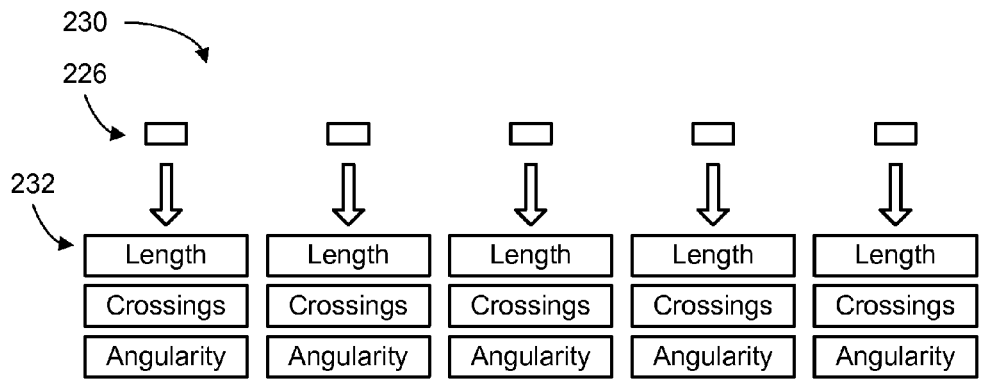
FIG. 9 depicts a schematic diagram of one embodiment of a process for generating a variety of voice metrics for each identified word from a voice input.

FIG. 9 depicts a schematic diagram of one embodiment of a process 230 for generating a variety of voice metrics 232 for each identified word 226 from a voice input 222. In the illustrated embodiment, the voice metrics generator 188 generates a length metric, a frequency crossings metric, and an angularity metric. These voice metrics generated by the voice metrics generator 188 may be used to facilitate further detailed analysis of each portion of the speech within a voice input to the server 102. Although certain voice metrics are identified and described herein, other embodiments of the voice metrics generator 188, the voice analyzer 158, and the sound analyzer 132 may utilize other types of metrics to represent larger or smaller portions of the frequency signals within the voice input 222.

Returning to FIG. 5, the word splitter engine 186, in one embodiment, may be used to subdivide each identified word into a plurality of smaller word segments. FIG. 12 depicts a schematic diagram of one embodiment of a process 260 for splitting words 226 into word segments 262. For each word segment 262 generated, the voice metrics generator 188 may generate one or more separate voice metrics such as length, frequency crossings, and angularity. The words segments 262 may be defined in several ways. In one embodiment, the word segments 262 may be identified based on the volume characteristics and the word boundary levels. Once these parameters are established, FFT may be performed on the entire segment. Then, in order to refine the segmentation, a "half life" may be performed on the word boundary, meaning a single word segment may be split into two (or more) word segments. This approach can be used to continually reduce the fingerprint of the segments down to as low of a resolution as may be desired. In some embodiments, reducing down one additional level (e.g., to define two word segments from each initial word segment identified) may be sufficient. However, in other embodiments, word segments may be reduced further into smaller segments over multiple iterations. For example, if a first level of segmentation results in a particular number of word segments, then each additional level of segmentation may double the number of word segments in the previous level. So, in this example, two levels of segmentation result in twice as many word segments as one level of segmentation. Similarly, three levels of segmentation result in twice as many word segments as two levels of segmentation, four levels of segmentation result in twice as many word segments as three levels of segmentation, and so forth. In relationship to increasing the number of word segments or sub-segments, the speed of analysis may be impacted in order to process a greater number of segments (e.g., double) with each additional level of segmentation. However, in many circumstances, one or two levels of segmentation may be sufficient within the context of a limited number of potential users anticipated at a particular number or location.

When voice metrics are generated for any portion of the voice input 222, those metrics may be used for a variety of purposes. As mentioned above, those voice metrics may be compared with default thresholds and/or patterns to determine if a voice input includes a live voice or a recorded voice. In another embodiment, newly generated voice metrics may be compared to stored voice metrics in order to identify the same or a similar person. For these types of comparisons, thresholds may be established to define whether or not a match exists or the voice input meets certain criteria to be categorized in a specific way.

Returning to FIG. 3, in one embodiment, the voice characterizer 160 uses the voice metrics generated by the voice analyzer 158 in order to determine if the voice input includes a live voice or a recorded voice. In one embodiment, the voice identifier 162 uses the voice metrics to attempt to find a match with stored voice metrics corresponding to a previous communication participant. If a match is found, then any stored data related to the previous communication participant may be useful to improve real-time or synchronous communications with the present communication participant.

Figure 7:
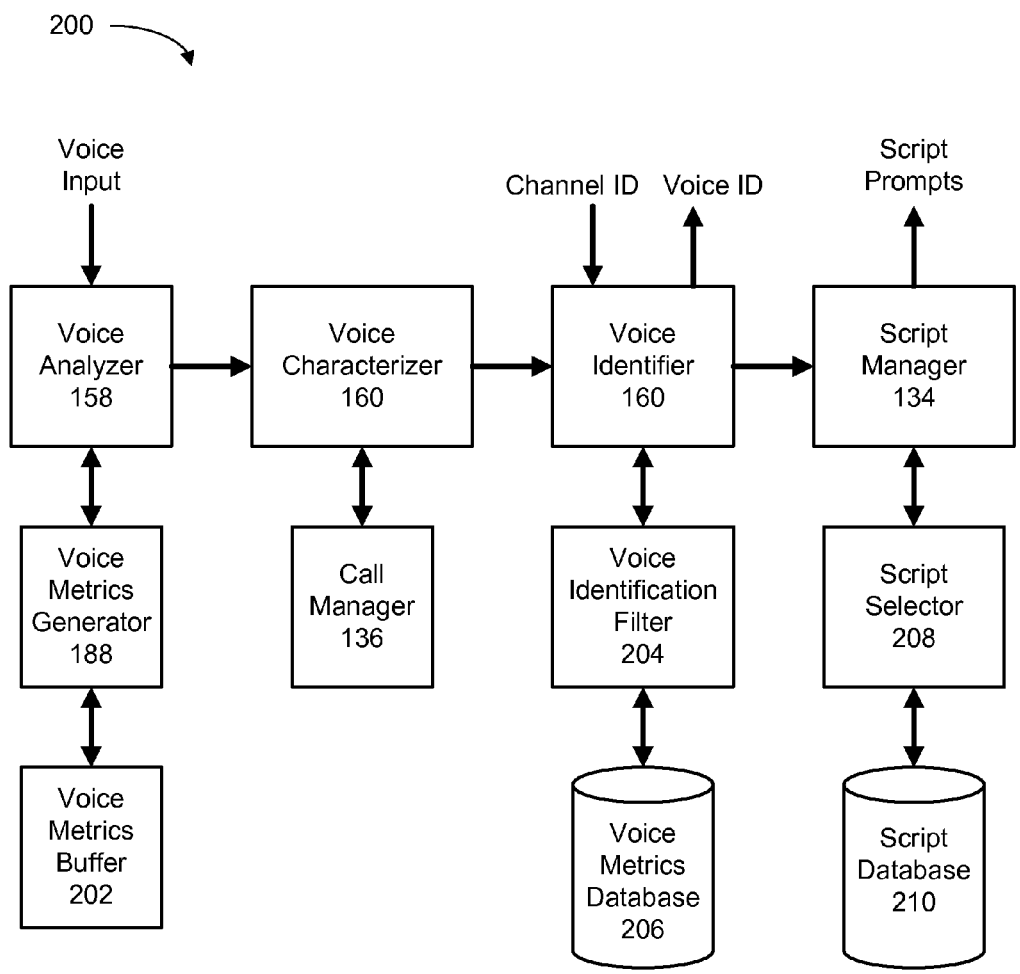
FIG. 7 depicts a schematic block diagram of one embodiment of a system process diagram for the voice identification system of FIG. 1.

FIG. 7 depicts a schematic block diagram of one embodiment of a system process diagram 200 for the voice identification system 100 of FIG. 1. In this process, the voice input is received by the voice analyzer 153. The voice analyzer 158 uses the voice metrics generator 188 to generate one or more voice metrics representative of the voice input. The generated voice metrics may be stored in a buffer 202 or other electronic storage device. The voice characterizer 160 then utilizes the generated voice metrics to determine if the voice input includes a live voice or a recorded voice. Depending on the determination by the voice characterizer 160, the call manager 136 may transfer the call to an agent (for a live voice) or otherwise dispose of the call (for a recorded voice).

The voice identifier 160 also may use the voice metrics to determine if the voice input has voice metrics similar to stored voice metrics corresponding to past communication participants. In one embodiment, the voice identifier 160 may compare the generated voice metrics to all past communication participants for whom stored voice metrics are available. However, due to resource and time constraints, in some embodiments, it may be useful to perform such comparisons with a much smaller pool of potential communication participants. Hence, the voice identifier 160 may utilize a voice identification filter 204 to establish a relatively small pool of potential communication participants with which the voice input might be compared. In one embodiment, the voice identification filter uses a channel identification (ID) to determine the pool of potential communication participants. The channel ID may refer to an identification number or string assigned to a particular household, telephone number, business address, or other distinguishable communication channel or channels. As an example, the home telephone number at a particular mailing or physical address may have stored information for three different voice inputs (having distinct voice metrics). Thus, when a call is established with the communication channel corresponding to that channel ID, the voice metrics for the communication participant on the new call can be compared with only the voice metrics corresponding to that same channel ID (and stored, for example, in a voice metrics database 206). This filtering process greatly reduces the amount of processing resources and time that might be allocated to the comparison process.

If a comparison match is identified, then the script manager 134 may send one or more script prompts to an operator at the agent terminal 106 that is managing the associated call. In one embodiment, the script manager 134 uses the comparison results to alter the script that would otherwise be presented to the communication participant. In particular, the script manager 134 may refer to a script selector 208, which references a script database 210 to select a script to use based on the results of the comparison and identification results from the voice identifier 160.

Figure 10:
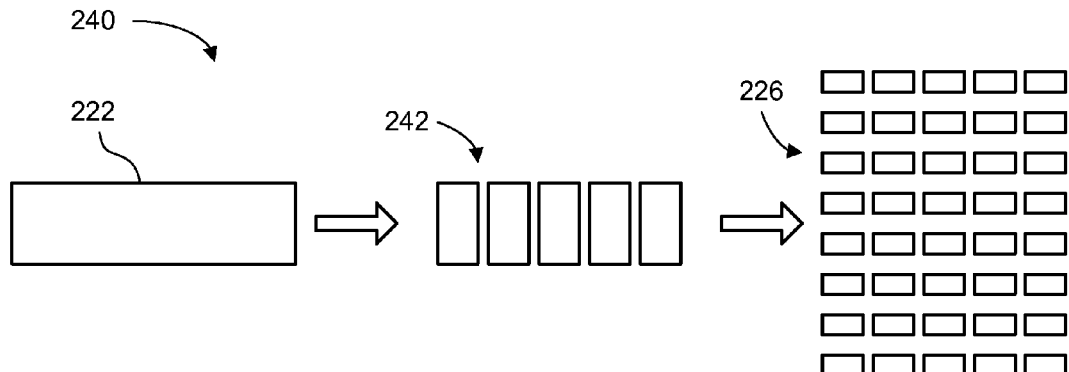
FIG. 10 depicts a schematic diagram of another embodiment of a process for applying word boundary delineation to a voice input.

Referring now to FIG. 10, a schematic diagram of another embodiment of a process 240 for applying word boundary delineation to a voice input 222 is shown. In this embodiment, the word boundary delineation 242 is performed prior to the FFT spectral analysis. Otherwise, this process 240 is similar to the process 200 shown in FIG. 8 and described above, both of which result in delineated words within separate frequency bands.

FIG. 11 depicts a schematic diagram of one embodiment of a process 250 for filtering frequency bands 226 from the voice input 220. This process may be implemented by the voice identification filter 204 or another component of the voice analyzer 158. In the illustrated embodiment, there are eight separate frequency bands. Of these, three bands are designated as primary frequencies, two bands are designated as secondary frequencies, and the remaining three bands are not used. In order to effectively use processing resources, it may be possible to disregard one or more of the frequency bands based on the assumption that such frequency bands are unlikely to include much useful signal data. In the illustrated example, bands 0 and 1 correspond to relatively low frequencies at the lower end of the audible frequency spectrum, and band 7 corresponds to relatively high frequencies at the higher end of the audible frequency spectrum. Since these frequencies typically include relatively little necessary information, it may be possible to ignore the signals in these bands without any meaningful degradation of the voice characterization and identification results. In other embodiments, bands 0, 1, and 7 may be for identification of non-verbal noise, even when these bands are not used for identification of voice or verbal noise. Similarly, it may be possible to assign lower weightings to secondary (or tertiary) frequency bands, while assigning higher weightings to primary frequency bands. Alternatively, it may be possible to perform initial operations based solely on a subset of the bands and then, if the results are not satisfactory according to a threshold, perform those operations again based on a combination of a slightly larger subset of the bands. While certain examples are described herein, there is no limitation on the numbers of categories that might be defined or the possible combinations of bands that might be evaluated together or in sequence.

FIG. 13 depicts a schematic diagram of one embodiment of a data structure 270 to store voice metrics and other information in the voice metrics database 210. In the illustrated data structure, the channel ID corresponds to an assigned identifier associated with a particular communication node, telephone line, or telephone device. The voice ID corresponds to a particular voice (or person) previously evaluated at the communication channel with that channel ID. The voice metrics are stored metrics for each identified voice ID. And the other data may include any beneficial information such as demographic information, behavioral information, contact information, and so forth.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Some embodiments described herein include at least one processing data device coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
   a connection manager to establish a verbal communication session on a transmission channel between at least two communication participants;
   a receiver to receive a transmission from the transmission channel associated with a channel identification, wherein the transmission comprises a voice input from a first communication participant;
   a voice analyzer coupled to the receiver, wherein the voice analyzer is configured to analyze the voice input and to generate a plurality of voice metrics according to a plurality of analysis parameters, wherein the voice metrics are descriptive of:
      a count of signal crossings within a segment of a frequency band; and
      an angular slope of a portion of a frequency signal within the segment of the frequency band;
   a voice identifier coupled to the voice analyzer, wherein the voice identifier is configured to compare the voice metrics to one or more stored sets of voice metrics, wherein each set of voice metrics corresponds to a voice identification associated with the channel identification, and the voice identifier is further configured to identify a match between the voice metrics from the voice analyzer and at least one of the stored sets of voice metrics; and a script manager to electronically modify a script presented to a second participant in response to identifying the match.

2. The system of claim 1, wherein the voice analyzer comprises a fast Fourier transform (FFT) engine, wherein the FFT engine is configured to generate a FFT spectrum analysis of the voice input, wherein the FFT spectrum analysis comprises a plurality of frequency bands from the voice input.

3. The system of claim 1, wherein the voice analyzer comprises a word boundary engine, wherein the word boundary engine is configured to identify a start boundary and an end boundary for a word within the voice input based on corresponding time periods preceding and following sounds determined to be the word.

4. The system of claim 3, wherein the voice analyzer is further configured to generate the plurality of voice metrics for each word identified by the word boundary engine.

5. The system of claim 3, wherein the voice analyzer further comprises a word splitter engine, wherein the word splitter engine is configured to split the word identified by the word boundary engine into a plurality of word segments.

6. The system of claim 5, wherein the voice analyzer is further configured to generate the plurality of voice metrics for each word segment identified by the word splitter engine.

7. The system of claim 1, wherein the voice analyzer comprises a segment length engine, wherein the segment length engine is configured to generate voice metrics descriptive of a length of a segment of a frequency band.

8. The system of claim 7, wherein the segment corresponds to a word within the voice input.

9. The system of claim 1, wherein the voice analyzer comprises a frequency crossing engine, wherein the frequency crossing engine is configured to generate the voice metrics descriptive of the count of signal crossings within the segment of the frequency band.

10. The system of claim 1, wherein the voice analyzer comprises an angularity engine, wherein the angularity engine is configured to generate the voice metrics descriptive of the angular slope of the portion of the frequency signal within the segment of the frequency band.

11. A method comprising:
  establishing a verbal communication session on a communication channel between at least two communication participants;
  identifying a channel identification for the communication channel;
  digitally analyzing a voice input from a first communication participant to generate a plurality of voice metrics descriptive of:
    a count of signal crossings within a segment of a frequency band; and
    an angular slope of a portion of a frequency signal within the segment of the frequency band;
  identifying the first communication participant of the at least two communication participants from a set of potential communication participants associated with the channel identification based on comparing the voice metrics to one or more stored sets of voice metrics; and
  electronically modifying a script presented to a second communication participant of the at least two communication participants in response to identifying the first communication participant, wherein the script comprises language prompts for the second communication participant to communicate to the first communication participant during the verbal communication session.

12. The method of claim 11, wherein identifying the first communication participant further comprises:
  digitally analyzing a voice input from the first communication participant to generate a plurality of voice metrics according to a plurality of analysis parameters;
  comparing the generated voice metrics to one or more stored sets of voice metrics, wherein each set of voice metrics corresponds to a voice identification associated with the channel identification; and
  identifying a match between the generated voice metrics and at least one of the stored sets of voice metrics.

13. The method of claim 12, wherein digitally analyzing the voice input from the first communication participant comprises generating a FFT spectrum analysis of the voice input, wherein the FFT spectrum analysis comprises a plurality of frequency bands from the voice input.

14. The method of claim 12, wherein digitally analyzing the voice input from the first communication participant comprises identifying a start boundary and an end boundary for a word within the voice input based on corresponding time periods preceding and following sounds determined to be the word.

15. The method of claim 14, further comprising generating the plurality of voice metrics for each identified word.

16. The method of claim 14, further comprising:
  splitting an identified word into a plurality of word segments; and
  generating the plurality of voice metrics for each word segment.

17. The method of claim 12, wherein digitally analyzing the voice input from the first communication participant comprises generating voice metrics descriptive of a length of a segment of a frequency band.

18. The method of claim 12, wherein digitally analyzing the voice input from the first communication participant comprises generating voice metrics descriptive of a count of signal crossings within a segment of a frequency band.

19. The method of claim 12, wherein digitally analyzing the voice input from the first communication participant comprises generating voice metrics descriptive of an angular slope of a portion of a frequency signal within a segment of a frequency band.

20. The method of claim 12, further comprising:
  comparing the voice metrics for the first communication participant to voice metrics of a plurality of other historical communication participants;
  identifying a match between the voice metrics for the first communication participant and the voice metrics of at least one of the plurality of historical communication participants based on a comparison threshold; and
  modifying the script presented to the second communication participant based on at least one historical script associated with the at least one historical communication participant whose associated voice metrics match the voice metrics for the first communication participant.

21. The method of claim 11, further comprising:
  accessing demographic information about the first communication participant in response to identifying the first communication participant; and
  modifying the script presented to the second communication participant in response to the demographic information associated with the first communication participant.

22. A method comprising:
monitoring verbal communications within a verbal communication session between a plurality of communication participants;
electronically comparing a flow of the verbal communications within the verbal communication session to a plurality of historical verbal communications stored in an electronic storage device;
digitally analyzing a voice input from one of the plurality of communication participants to generate a plurality of voice metrics descriptive of:
a count of signal crossings within a segment of a frequency band; and
an angular slope of a portion of a frequency signal within the segment of the frequency band;
identifying the one of the plurality of communication participants based on comparing the voice metrics to one or more stored sets of voice metrics;
determining that the flow of the verbal communications within the verbal communication session is compatible with at least one of the plurality of historical verbal communications;
deriving at least one script prompt from the at least one of the plurality of historical verbal communications with which the flow of the verbal communications within the verbal communication session is determined to be compatible; and
electronically providing the derived script prompt to a first communication participant of the plurality of communication participants during the verbal communication session.

23. The method of claim 22, further comprises identifying a trigger event while monitoring the verbal communications within the verbal communication session.

24. The method of claim 23, further comprising electronically comparing the flow of the verbal communications within the verbal communication session to the plurality of historical verbal communications in response to the trigger event.

25. The method of claim 23, further comprising postponing the electronically providing the derived script prompt to the first communication participant until after a threshold number of trigger events are identified.

26. The method of claim 23, further comprising:
electronically analyzing a voice input of the first communication participant; and
identifying the trigger event from the voice input of the first communication participant.

27. The method of claim 23, further comprising:
electronically analyzing a voice input of second communication participant other than the first communication participant; and
identifying the trigger event from the voice input of the second communication participant.

28. The method of claim 23, further comprising:
electronically analyzing a combination of voice inputs from the plurality of communication participants; and
identifying the trigger event from the combination of voice inputs from the plurality of communication participants.

29. A computer program product comprising:
a non-transitory computer readable storage medium storing instructions thereon which, when executed by a computer processing device, cause the computer processing device to perform operations, wherein the operations comprise:
establishing a verbal communication session on a communication channel between at least two communication participants;
identifying a channel identification for the communication channel;
digitally analyzing a voice input from a first communication participant to generate a plurality of voice metrics descriptive of:
a count of signal crossings within a segment of a frequency band; and
an angular slope of a portion of a frequency signal within the segment of the frequency band;
identifying the first communication participant of the at least two communication participants from a set of potential communication participants associated with the channel identification based on comparing the voice metrics to one or more stored sets of voice metrics; and
electronically modifying an ongoing script presented to a second communication participant of the at least two communication participants in response to identifying the first communication participant, wherein the script comprises language prompts for the second communication participant to communicate to the first communication participant during the verbal communication session.

30. The computer program product of claim 29, wherein identifying the first communication participant further comprises:
digitally analyzing a voice input from the first communication participant to generate a plurality of voice metrics according to a plurality of analysis parameters;
comparing the generated voice metrics to one or more stored sets of voice metrics, wherein each set of voice metrics corresponds to a voice identification associated with the channel identification; and
identifying a match between the generated voice metrics and at least one of the stored sets of voice metrics.

31. The computer program product of claim 30, wherein digitally analyzing the voice input from the first communication participant comprises generating a FFT spectrum analysis of the voice input, wherein the FFT spectrum analysis comprises a plurality of frequency bands from the voice input.

32. The computer program product of claim 30, wherein digitally analyzing the voice input from the first communication participant comprises identifying a start boundary and an end boundary for a word within the voice input based on corresponding time periods preceding and following sounds determined to be the word.

33. The computer program product of claim 32, further comprising operations for generating the plurality of voice metrics for each identified word.

34. The computer program product of claim 32, further comprising operations for:
splitting an identified word into a plurality of word segments; and
generating the plurality of voice metrics for each word segment.

35. The computer program product of claim 30, wherein digitally analyzing the voice input from the first communication participant comprises generating voice metrics descriptive of a length of a segment of a frequency band.

36. The computer program product of claim 30, wherein digitally analyzing the voice input from the first communication participant comprises generating voice metrics descriptive of a count of signal crossings within a segment of a frequency band.

37. The computer program product of claim 30, wherein digitally analyzing the voice input from the first communication participant comprises generating voice metrics descriptive of an angular slope of a portion of a frequency signal within a segment of a frequency band.

38. The computer program product of claim 30, further comprising operations for:
- comparing the voice metrics for the first communication participant to voice metrics of a plurality of other historical communication participants;
- identifying a match between the voice metrics for the first communication participant and the voice metrics of at least one of the plurality of historical communication participants based on a comparison threshold; and
- modifying the script presented to the second communication participant based on at least one historical script associated with the at least one historical communication participant whose associated voice metrics match the voice metrics for the first communication participant.

39. The computer program product of claim 29, further comprising operations for:
- accessing demographic information about the first communication participant in response to identifying the first communication participant; and
- modifying the script presented to the second communication participant in response to the demographic information associated with the first communication participant.

* * * * *